United States Patent
Nimberger (12)

(10) Patent No.: US 6,176,262 B1
(45) Date of Patent: Jan. 23, 2001

(54) TWO-PIECE MANIFOLD SYSTEM FOR PRESSURE SENSING TRANSMITTERS

(76) Inventor: Spencer M. Nimberger, 13711 Chelwood Pl., Houston, TX (US) 77069

( * ) Notice: Under 35 U.S.C. 154(b), the term of this patent shall be extended for 0 days.

(21) Appl. No.: 09/394,753

(22) Filed: Sep. 13, 1999

Related U.S. Application Data (60) Provisional application No. 60/100,203, filed on Sep. 14, 1998.

(51) Int. Cl.$^7$ ....................................................... F17D 1/00
(52) U.S. Cl. ............................. 137/597; 137/343; 73/201
(58) Field of Search ..................................... 137/597, 343; 73/201

(56) References Cited

U.S. PATENT DOCUMENTS

| | | | |
|---|---|---|---|
| 4,182,362 | * 1/1980 | Hewson et al. | 137/340 |
| 4,582,089 | * 4/1986 | Nimberger | 137/884 |
| 4,672,728 | * 6/1987 | Nimberger | 29/890.142 |
| 5,277,224 | 1/1994 | Hutton et al. . | |
| 5,668,322 | * 9/1997 | Broden | 73/756 |
| 6,009,758 | * 1/2000 | Petrich et al. | 73/756 |

OTHER PUBLICATIONS

IntelliMount™ System, "a new generation of instrument manifold systems", Anderson Greenwood tyco flow contgrol.

Model 305 and 306 Manifold Solutions, Rosemount$^R$, Fisher–Rosemount™ Managing The Process Better™.

Model 305 Integral Manifolds, Rosemount$^R$ Measurement, Fisher–Rosemount™ Managing The Process Better™.

* cited by examiner

*Primary Examiner*—A. Michael Chambers
*Assistant Examiner*—Thomas L. McShane
(74) *Attorney, Agent, or Firm*—Jenkens & Gilchrist A Professional Corporation (57) ABSTRACT

Different functional control manifolds, adapted for specific process and test applications, are selectively mounted on a common base manifold which independently provides sealing of the process lines of a fluid handling system. This enables a specific functional control manifold such as a single block and controlled vent manifold, a single block and vent manifold, or a double block and bleed cross-over manifold, to be preassembled with a test instrument prior to installation of the test instrument to the base manifold. Each embodiment of the functional control manifold is designed so that the sensing cavities of the test instrument are able to fully drain through the functional control manifold into the base manifold, thereby eliminating a potential source of error during calibration of the test instrument.

6 Claims, 7 Drawing Sheets

TWO-PIECE MANIFOLD SYSTEM FOR PRESSURE SENSING TRANSMITTERS

This application claims the benefit under Title 35 United States Code §119(e) of U.S. Provisional Application Ser. No. 60/100,203, filed Sep. 14, 1998.

BACKGROUND OF THE INVENTION

1. Technical Field

This invention relates generally to a manifold system for mounting pressure sensing transmitters, and more particularly such a manifold system having separate common base and interchangeable functional manifold components.

2. Background Art

Multi-valve manifolds are typically used to mount pressure-sensing devices, such as Rosemount® Coplanar™ style pressure transmitters. For example, U.S. Pat. No. 5,277,224 issued Jan. 11, 1994 to Peter B. Hutton, et al. discloses a five-valve manifold for use with a pressure sensing apparatus. Other arrangements include the Intelli-Mount™ System, manufactured by Anderson Greenwood, and the Model 305 and 306 family of manifolds manufactured by Rosemount, Inc. The Model 305 and 306 manifolds require assembly with a transmitter prior to arrival of the assembly on-site, thus prohibiting connection of process lines to the manifold prior to installation of the transmitter. Furthermore, none of the above-referenced manifolds permit a functional manifold change without involving the manifold-to-process line connections. A further disadvantage of the IntelliMount™ manifold arrangement is that condensate cannot be fully drained from all pressure cavities to avoid potential calibration errors in the pressure sensing transmitter.

It is therefore desirable to have a two-piece manifold system which allows pressurizing of process lines with a base manifold component of the system in place, prior to a transmitter arriving on site. It is further desirable to have a functional control manifold component that attaches directly to the transmitter, and can be assembled with the transmitter at the factory or shop whereat it can be accurately torqued to the value required by the transmitter manufacturer. Pre-attachment of the functional manifold also protects the transmitter sensing foils during subsequent shipment and installation of the transmitter onto a pre-installed base manifold. Additionally, provision of a separate functional manifold, allows functional manifold changes without compromising the base manifold and possible shut down of a process system as a result of open pressure lines. It is further desirable to have a two-piece manifold system for mounting pressure-sensing transmitters in which condensate will fully drain from all pressure cavities to avoid potential errors during calibration of the pressure transmitting apparatus.

SUMMARY OF THE INVENTION

In one aspect of the present invention, a two-piece manifold system includes separable base and functional control manifolds. The base manifold has internal passageways that extend between inlet and outlet ports that are controlled by flow control valves. base manifold also has a first side in which the inlet ports are disposed and which communicate with respective separate ones of the internal passageways, and a second side which has outlet ports provided thereon and which also are in fluid communication with respective separate ones of the internal passageways. The functional control manifold component of the two-piece manifold system embodying the present invention has a first side adapted to mate with the second side of the base manifold component, and a second side adapted to mate with a predefined mounting surface of a test instrument. The functional manifold also includes a pair of inlet ports disposed on the first side and a pair of outlet ports provided on the second side, with first and second internal passageways extending between respective ones of the inlet ports and outlet ports. The functional control manifold further includes a third passageway extending between the first and second internal passageways and at least one flow control valve disposed in the third passageway to control fluid flow between the first and second internal passageways. The two-piece manifold system also includes a means for attaching the functional control manifold to the base manifold and a means for attaching the functional control manifold to the test instrument.

In one embodiment of the two-piece manifold system embodying the present invention, the functional control manifold also includes fourth and fifth internal passageways and first and second vent ports. The fourth internal passageway provides fluid communication between the first internal passageway and the first vent port, and the fifth internal passageway provides fluid communication between the second internal passageway and the second vent port.

In a second embodiment, the functional control manifold additionally includes a second flow control valve arranged to selectively control the flow of fluid through the fourth internal passageway, and a third flow control valve arranged to selectively control the flow of fluid through the fifth internal passageway.

In a third embodiment of the functional control manifold embodying the present invention, an additional internal passageway extends between the above-described third internal passageway and a vent port, and a flow control valve arranged to control the flow of fluid through a portion of the third passageway that extends between the first internal passageway and the additional internal passageway. A second flow control valve is arranged to control the flow of fluid through a portion of the third internal passageway extending between the second internal passageway and the additional internal passageway. A third flow control valve is arranged to control the flow of fluid through the additional internal passageway.

BRIEF DESCRIPTION OF THE DRAWINGS

A more complete understanding of the structure and operation of the present invention may be had by reference to the following detailed description, when taken in conjunction with the accompanying drawings wherein.

DETAILED DESCRIPTION OF PRESENTLY PREFERRED EXEMPLARY EMBODIMENTS

Figure 1:
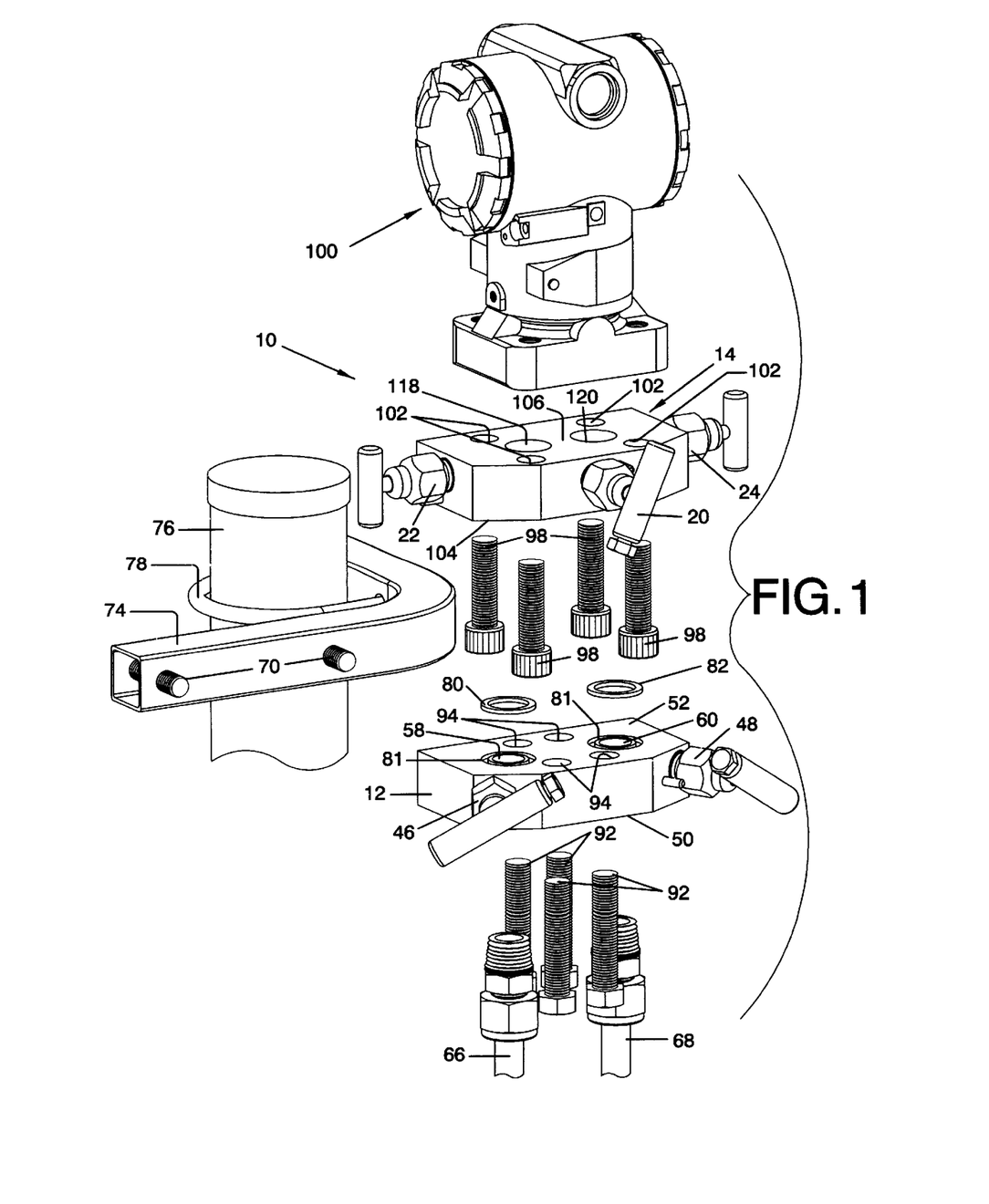
FIG. 1 is an exploded three-dimensional view of one embodiment of a two-piece manifold system embodying the present invention, showing a pressure transducer mounted on the two-piece manifold system.
Figure 11:
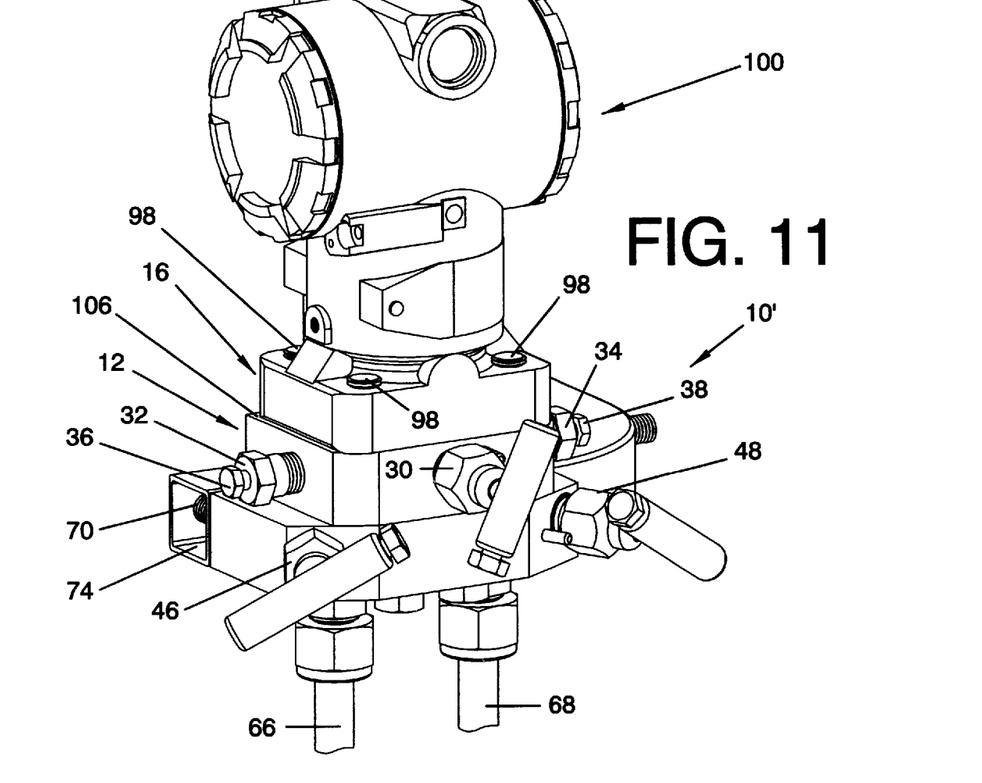
FIG. 11 is a three-dimensional view of a second embodiment of the two-piece manifold system embodying the present invention, showing a second functional manifold mounted to the common base manifold component.
Figure 12:
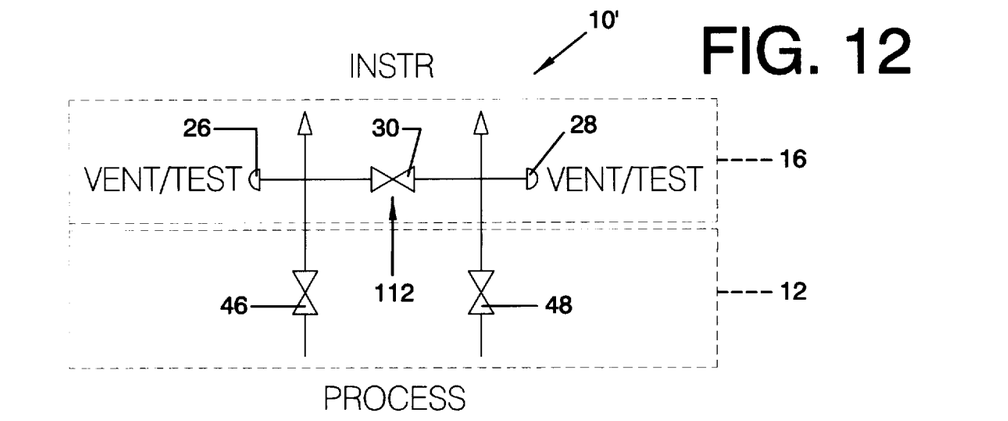
FIG. 12 is a schematic diagram of the second embodiment of the two-piece manifold system embodying the present invention, as illustrated in FIG. 11.
Figure 13:
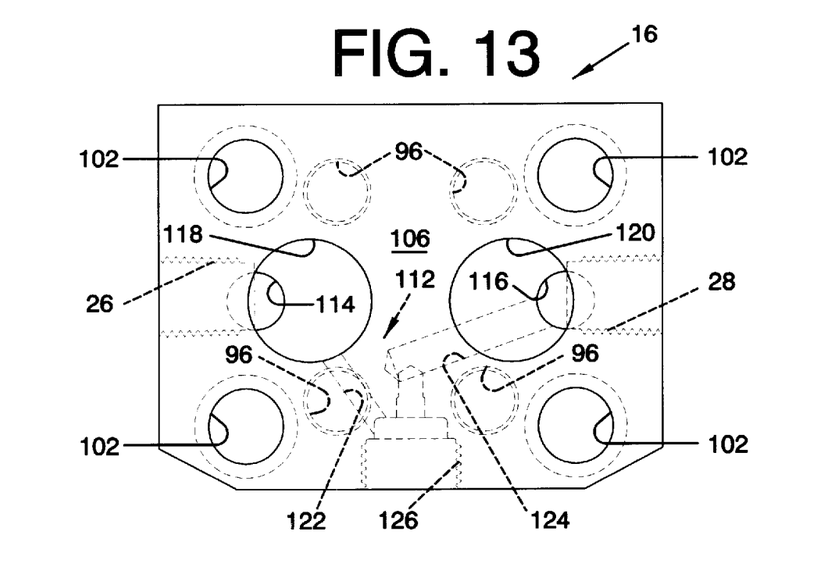
FIG. 13 is a top view of the second functional manifold illustrated in FIG.
Figure 14:
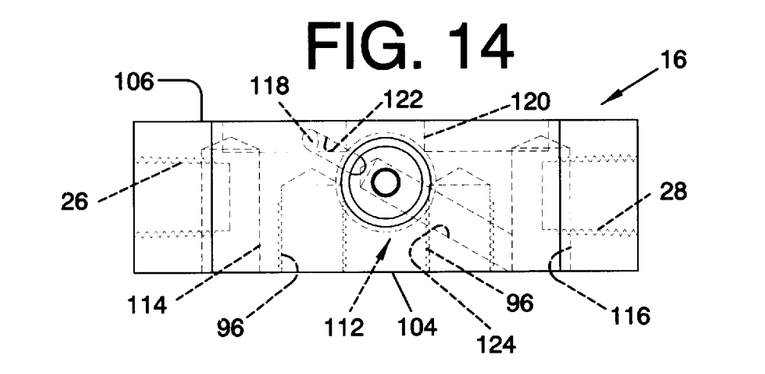
FIG. 14 is a front view of the second functional manifold embodiment of the two-piece manifold system embodying the present invention.
Figure 15:
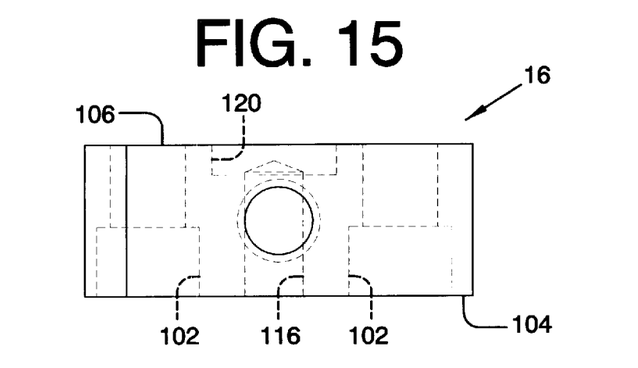
FIG. 15 is a side view of the second functional manifold embodiment of the two-piece manifold system embodying the present invention.
Figure 16:
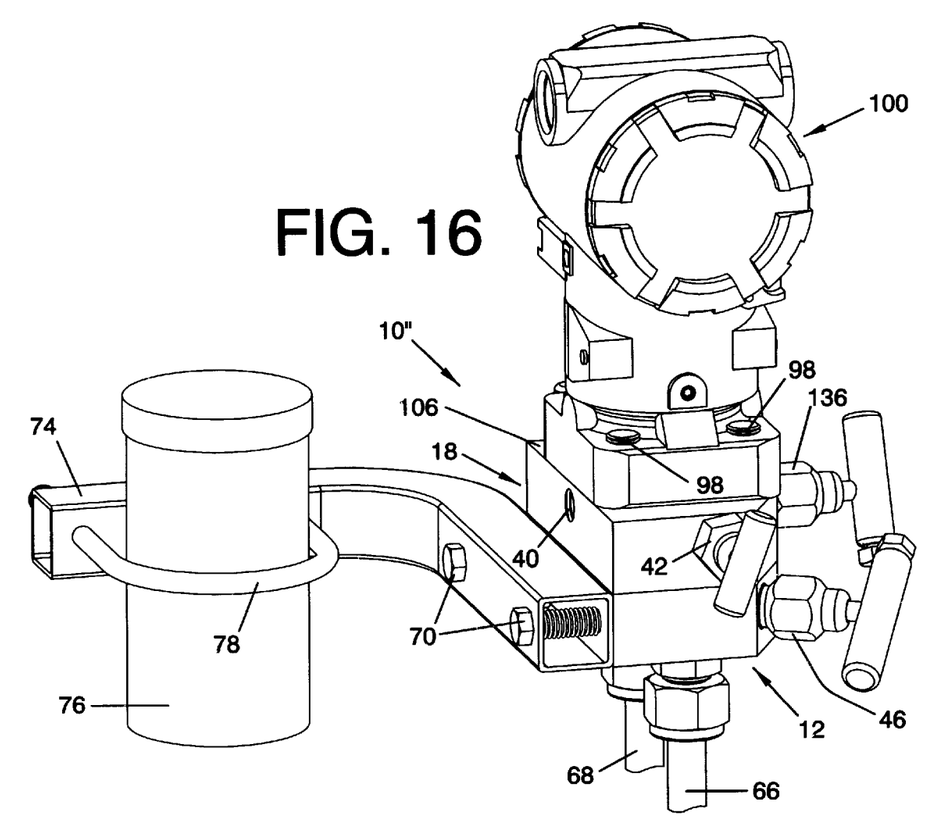
FIG. 16 is a is a three-dimensional view of a third embodiment of the two-piece manifold system embodying the present invention, showing a third functional manifold mounted to the common base manifold component.

The two-piece manifold system embodying the present invention is generally indicated in FIGS. 1, 11 and 16 by the reference numeral 10, 10', and 10". The manifold system 10, 10', and 10" includes a base manifold 12 that is common in each of the three illustrated embodiments of functional control manifolds. In the first embodiment 10, the functional control manifold is indicated by the reference numeral 14 in FIGS. 1, 2, and 7–10. The second embodiment 10' of the functional control manifold component of the two-piece manifold system 10 embodying the present invention is represented by the reference numeral 16 in FIGS. 11–15. In the third embodiment 10", the functional control manifold is represented by the reference numeral 18 in FIGS. 16–21. The functional control manifolds, 14, 16, 18, include specific internal passageway and valve arrangements that are applicable to particular installation and test requirements, and will be described individually in greater detail below.

In the first embodiment 10, the functional control manifold 14 is arranged to provide a single blocking valve 20 and two vent control valves 22, 24 which respectively control flow to vent ports 26, 28. This arrangement permits vented pressure to be controllably directed to a desired repository instead of discharged into the atmosphere and is particularly desirable when dealing with hazardous materials. In the second embodiment 10', the functional control manifold 16 is a single block and vent manifold in which a single blocking valve 30 and two vent plugs 32, 34, each of which have a respective needle valve 36, 38 incorporated therein to vent pressure directly to the atmosphere. This arrangement avoids the necessity of the vent port control valves incorporated in the first embodiment when dealing with non-hazardous materials, or if it is not desired to controllably discharge pressure to a preselected repository. In the third embodiment 10", the third functional control manifold 18 is a double block and bleed cross-over manifold which enables testing of the manifold to assure that none of the cross-over valves are leaking, which, if that were the case, would compromise the values of the sensed pressure at the transmitter. In this arrangement, a single vent port 40 is provided on the rear face of the function control manifold 18 along with a pair of blocking valves 42, 44 and a vent port control valve 136 arranged to control fluid flow to the vent port 40.

Turning now to more specific descriptions of each component of the two-piece manifold system 10, 10', and 10" embodying the present invention, the base manifold 12, is used in all embodiments and is essentially a blocking manifold which includes a first blocking valve 46 and a second blocking valve 48. The blocking valves 46, 48 are disposed in the body of the base manifold 12 which has a first side 50 and a second side 52 spaced from the first side 50. The first side 50 has a first inlet port 54 and a second inlet port 56 provided thereon. The second side 52 of the base manifold 12 has a first outlet port 58 and a second outlet port 60 provided thereon. A first internal passageway 62 and a second internal passageway 64 respectively provide communication between the first inlet port 54 and the first outlet port 58 and between the second inlet port 56 and the second outlet port 60. The blocking valves 46, 48 block fluid flow through the respective internal passageways 62, 64. The inlet ports 54, 56 are adapted for connection with respective process pressure lines 66, 68 of a pressurized fluid system. The process lines 66, 68, and thus fluid communication with the pressurized fluid system, can be sealed after connection to the base manifold 12 by closure of the blocking valves 44, 46.

In a typical installation, as illustrated in FIGS. 1, 11 and 16, the base manifold 12 is mounted on a standard, pipe, or column 76 by bolts 70 which respectively engage threaded holes 72 provided in the rear surface of the base manifold 12. The bolts 70 extend outwardly from a fixture 74 that is secured to the standard 76 by a hanger 78.

The second side 52 of the base manifold 12 desirably includes a provision for receiving respective seals 80, 82 which are concentrically disposed in preformed grooves 81 around the outlet ports 58, 60. Thus, when the base manifold 12 is assembled with a selected one of the functional control manifolds 14, 16, 18, of the two-piece manifold system 10, 10', and 10", flow between the process pressure lines 66, 68 and the respective functional control manifold is controlled by the blocking valves 46, 48.

As best shown in FIGS. 3–6, communication between the inlet ports 54, 56 and the valve seat pocket of the blocking valves 46, 48 is provided by respective first portions 84, 86 of the internal passageways 62, 64, and between the outlet ports 58, 60 and the corresponding valve seat pockets by second portions 88, 90 of the internal passageways 62, 64. The internal passageway portions 84, 86, 88, 90 cooperate to provide an important internal drainage function described below in greater detail.

Figures 2, 3, 4, 5:
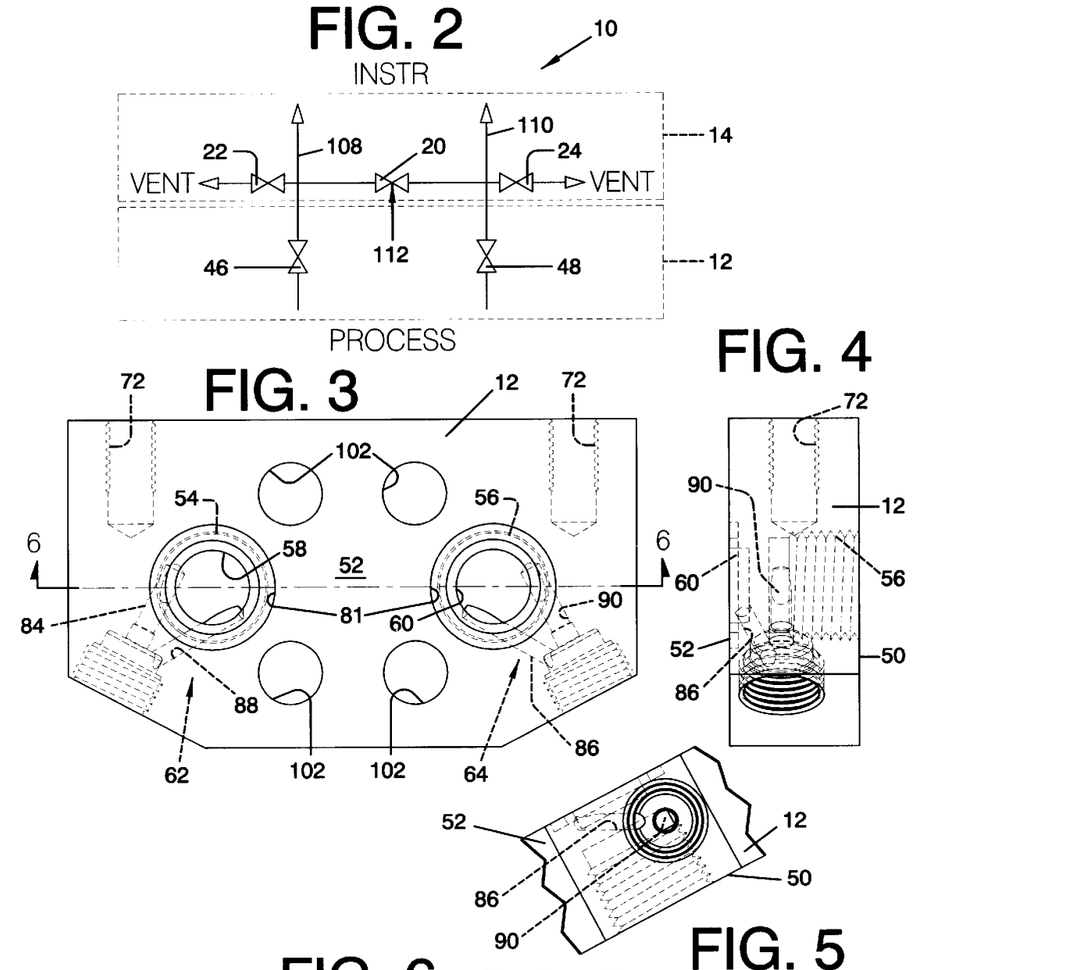
FIG. 2 is a schematic diagram of the first embodiment, illustrated in FIG. 1, of the two-piece manifold system embodying the present invention.
FIG. 3 is a top view of a base manifold component of the two-piece manifold system embodying the present invention.
FIG. 4 is a side view of the base manifold component of the two-piece manifold system embodying the present invention.
FIG. 5 is a side view of an angled portion of the base manifold component of the two-piece manifold system embodying the present invention.
Figure 6:
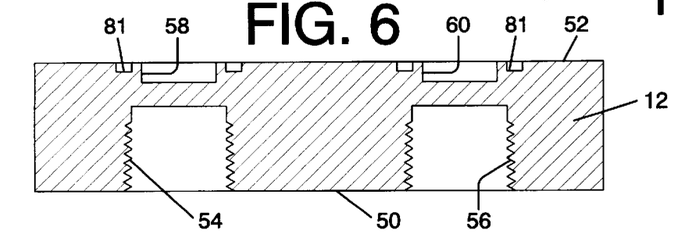
FIG. 6 is a cross-sectional view of the base manifold component of the two-piece manifold system embodying the present invention, taken along the line 6—6 of FIG. 3.
Figure 7:
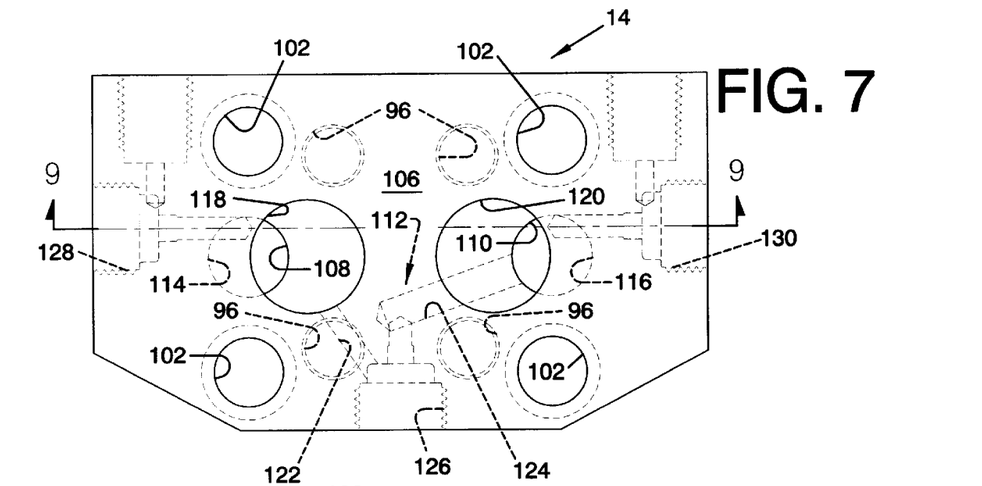
FIG. 7 is a top view of a first functional manifold component, as illustrated in FIG. 1, of the two-piece manifold system embodying the present invention.
Figure 8:
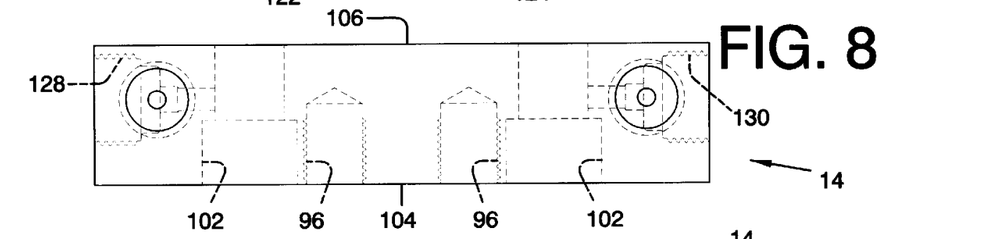
FIG. 8 is a rear view of the functional manifold shown in FIG. 7.
Figure 9:
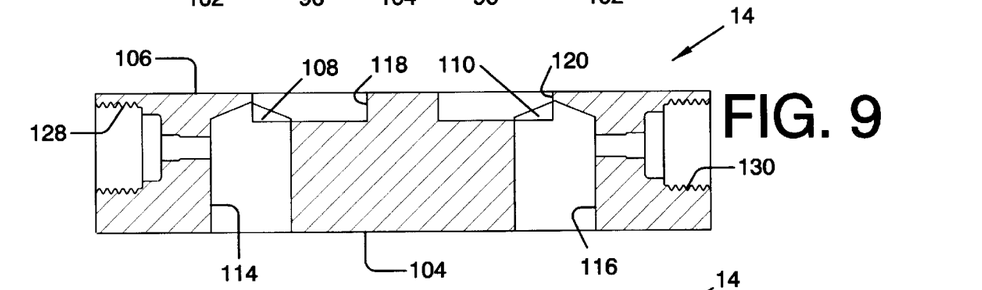
FIG. 9 is a cross-sectional view of the functional manifold component of the two-piece manifold system embodying the present invention, taken along the line 9—9 of FIG. 7.
Figure 10:
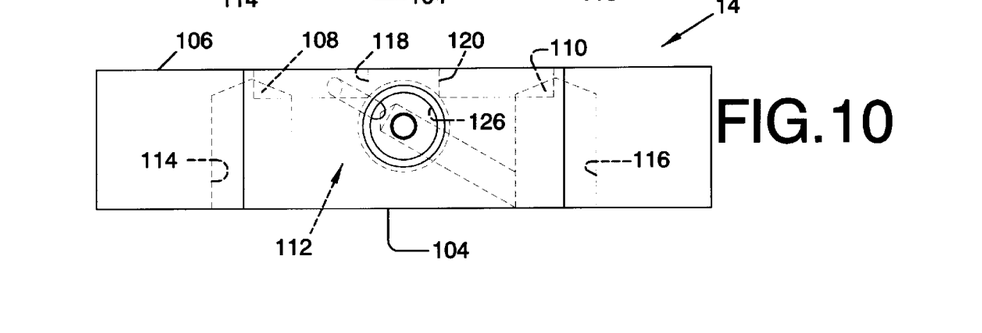
FIG. 10 is a frontal view of the first functional manifold component.

In each of the illustrated embodiments, the functional control manifolds 14, 16, 18 are respectively mounted to the base manifold 12 by appropriate means, such as a plurality of bolts 92 which extend through holes 94, best shown in FIG. 3, and engage threads 96 provided in the respective functional manifold 14, 16, 18. The bolts 92, through holes 94, and threaded holes 96 cooperate to provide an easy, convenient, means for attaching the respective functional manifold 14, 16, 18 to the base manifold 12. As described above, the base manifold 12 can be advantageously attached to the process lines 66, 68, and the process lines sealed by closure of the blocking valves 46, 48 in the base manifold 12. This enables the base manifold 12 to be premounted at its desired location, and then a test instrument 100, such as the pressure sensing and transmitting instrument described in the Background Art section above, premounted to a selected one of the functional control manifolds 14, 16, 18 which can then be attached to the prepositioned base manifold 12. This arrangement allows the appropriate functional control manifold 14, 16, 18 to be preattached to the mounting surface on the test instrument 100 prior to installation of the test instrument in the field.

Thus, the functional control manifold can be attached to the test instrument 100 in a shop or lab, and the attachment bolts torqued to the instrument manufacturer's specified values under controlled conditions. In the present invention, a means for mounting the functional control manifold 14, 16, 18 to the test instrument 100 is provided by a plurality of cap screws 98 that extend through stepped holes 102 provided in the body of the functional manifold 14, 16, 18, as respectively illustrated in FIGS. 7 and 8, FIGS. 13 and 15, and FIGS. 18 and 20. Each of the stepped holes 102 extending through the functional manifold 14, 16, 18 is relieved on the lower end so that the heads of the cap screws 98 are fully recessed within the functional control manifold 14, 16, 18 when it is secured to the pressure transmitter 100.

Each of the functional control manifolds 14, 16, 18 have a first side 104 adapted to mate with the second side 52 of the base manifold 12 and a second side 106 that is spaced from the first side 104 and is adapted to mate with a predefined mounting surface of the test instrument 100. Each of the functional control manifolds 14, 16, 18 has first and second inlet ports 114, 116 disposed on the first side 104 of the manifold and arranged to respectively mate with the first and second outlet ports 58, 60 of the base manifold 12. Further, each of the functional control manifolds 14, 16, 18 have first and second outlet ports 118, 120 disposed on the second side 106 that are arranged to mate with the sensing ports of the test instrument 100. Each of the functional control manifolds 14, 16, 18 also have a first internal passageway 108 providing fluid communication between the first inlet port 114 and the first outlet port 118, a second internal passageway 110 providing fluid communication between the second inlet port 116 and the second outlet port 120, and a third internal passageway 112 providing fluid communication between the first internal passageway 108 and the second internal passageway 110.

In the first preferred embodiment 10 of the present invention, the functional control manifold 14 includes a fourth internal passageway 122 extending between the first inlet port 114, and accordingly the first internal passageway 108, and the vent port 26, and a fifth internal passageway 124 extending between the second inlet port 116, and accordingly the second internal passageway 110, and the vent port 28. In this embodiment, the blocking valve 20 functions as a cross-over valve that controls fluid communication between the first internal passageway 108 and the second internal passageway 110. When the cross-over valve 20 is closed, pressure in the first internal passageway 108 can be controllably vented by opening the vent control valve 22. In a similar manner, with the cross-over valve 20 closed, pressure in the second internal passageway 110 can be controllably vented by opening the vent control valve 24. When the cross-over blocking valve 20 is open, and the vent port control valves 22, 24 are closed, pressure in the first and second internal passageways 108, 110 is equalized, or balanced.

With specific reference to FIGS. 7–10, the cross-over valve 20 is mounted in a threaded valve pocket 126 and the vent control valves 22, 24 are respectively seated in threaded valve pockets 128, 130. Pressure in the respective process line 66, 68, controlled by blocking valves 46, 48 in the base manifold 12, is introduced into the functional control manifold 14 through the first and second inlet ports 54, 56 at the bottom of the functional control manifold 14, and respectively discharged through the first and second outlet ports 118, 120 at the top of the functional control manifold 14 to the corresponding sensing ports of the pressure transmitter 100. The recessed ends of the inlet ports 114, 116 intersect a recessed portion of the respective first and second outlet ports 118, 120 and cooperate to form the aforementioned first and second internal passageways 108, 110. Fluid communication between the first inlet port 114 and the vent port 26 is provided by the fourth internal passageway 122 extending between the first inlet port 114 and the valve seat pocket 128, and by an elongated recess at the bottom of the vent port 26 that extends to the threaded valve seat pocket 128. In like manner, fluid communication between the second inlet port 116 and the vent port 28 is provided by the fifth internal passageway 124 extending between the second inlet port 120 and the threaded valve seat pocket 130, and by an elongated recess in the bottom of the vent port 28 that extends into the threaded valve seat pocket 130. Fluid communication between the first and second internal passageways 108, 110 is provided by a first portion of the third internal passageway 112 which extends between the first inlet port 108 and the valve seat pocket 126 and is downwardly sloping from the inlet port 108 to the valve seat pocket 126. A second portion of the third internal passageway 112 extends between the second inlet port 110 and the threaded valve seat pocket 126, and slopes downwardly from the threaded valve seat pocket 126 to the second inlet port 110. When the blocking valve 20 is opened, the first inlet port 108 is in direct fluid communication with the second inlet port 110, by way of the open seat pocket 126.

Importantly, any condensate that may collect or be retained within the pressure cavities of the test instrument 110, or in the functional control manifold 114, will full drain through the following path: The pressure transmitter ports will fully drain through the respective outlet ports 118, 120, and thence through the corresponding internal passageways 108, 110 to the respective inlet ports 114, 116. Any fluid trapped within the third internal passageway 112 of the functional control manifold 14 will drain through the downwardly sloping portions of the third internal passageway 112 to the second inlet port 116. Fluid for the first and second inlet ports 108, 110, then flows to the base manifold 12.

In a second embodiment of the two-piece manifold system 10', illustrated in FIGS. 11–15, the functional control manifold 16 is similar to the functional control manifold 14 described above, and like the functional control manifold 14 has a blocking, or cross-over, valve 30 mounted in a threaded valve seat pocket 126 on the front face of the manifold 16 that controls fluid communication between the first internal passageway 108 and the second internal passageway 110. The functional control manifold 16 employed in the second embodiment, is shown in detail in FIGS. 13–15, with the primary difference between the functional manifold 14 and the functional manifold 16 being that the vent control valves 22, 24 employed in the functional control manifold 14 are replaced by the vent plugs 32, 34 which respectively have needle valves 36, 38 mounted within the plug. By opening the respective needle valve 36, 38, pressure in the respective first or second internal passageway 108, 110 is vented directly to atmosphere. Thus, the single block and vent functional manifold 16 does not have valve controlled vent ports 26, 28 as provided in the functional control manifold 14. The first and second internal passageways 108, 110, providing fluid communication between the process lines 66, 68 and the test instrument 100, and the third internal passageway 112 providing fluid communication between the first and second internal passageways 108, 110 through the threaded valve seat pocket 126, are arranged in the same manner as described above with respective functional control manifold 14. In like manner, the drain path for condensate from pressure cavities in the transmitter 100 and functional manifold 16 is the same as that described above for the functional control manifold 14.

Figure 17:
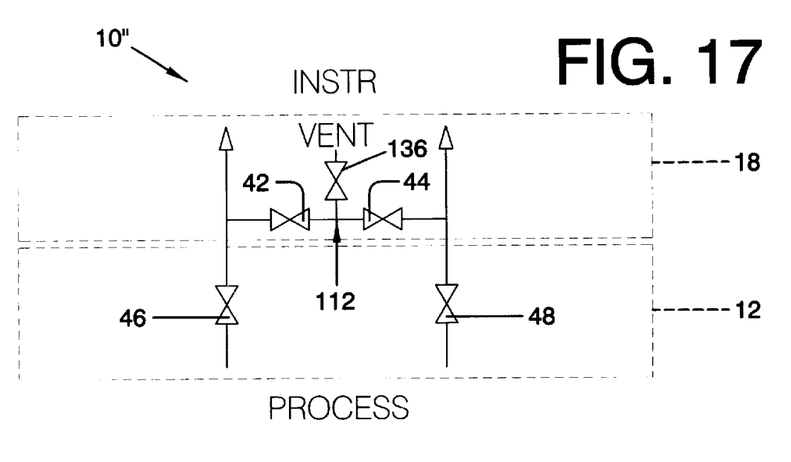
FIG. 17 a schematic diagram of the third embodiment of the two-piece manifold system embodying the present invention, as illustrated in FIG. 16.
Figure 18:
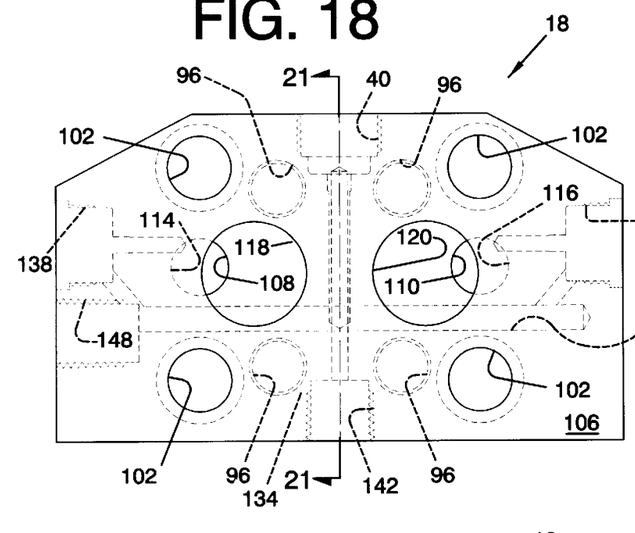
FIG. 18 is a top view of the third functional manifold illustrated in FIG. 16.
Figure 19:
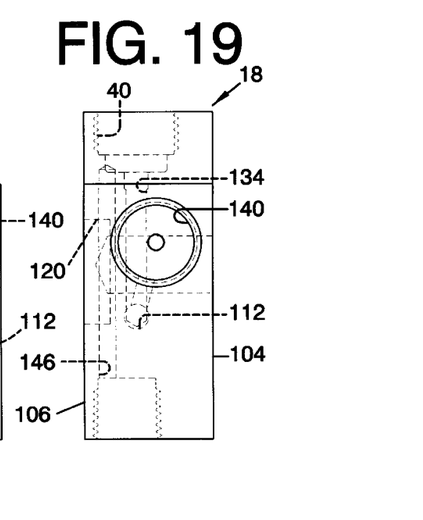
FIG. 19 is a side view of the third functional manifold embodiment of the two-piece manifold system embodying the present invention.
Figure 20:
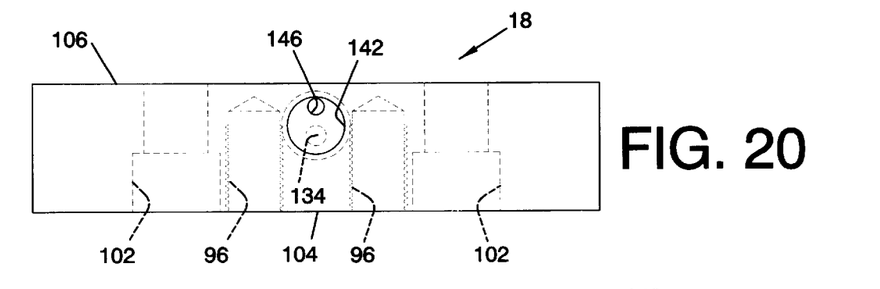
FIG. 20 is a front view of the third functional manifold embodiment of the two-piece manifold system embodying the present invention.
Figure 21:
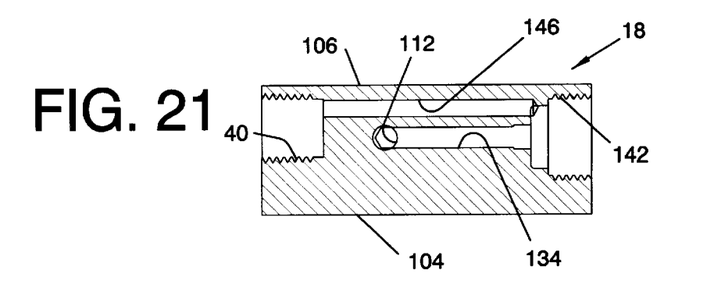
FIG. 21 is a cross-sectional view of the third functional manifold embodiment of the two-piece manifold system embodying the present invention, taken along the line 21—21 of FIG. 18.

In the third embodiment of the two-piece manifold 10", as illustrated in FIGS. 16–21, the functional control manifold 18 provides a double block and bleed cross-over function, as schematically illustrated in FIG. 17. This arrangement enables testing of the functional control manifold 18 to assure that the cross-over valves are not leaking, which, if that were the case, would compromise the sensed pressure values at the test instrument sensors. In this arrangement, the single vent port 40 is positioned on the rear surface of the functional control manifold 18. A fourth internal passageway 134, extends between the third internal passageway 112 and a threaded valve seat pocket 142 provided in the front face of the manifold 18 and in which the vent port control valve 136 is seated. Fluid flow through the fourth internal passageway 134 is controlled by vent control valve 136 mounted on the front face of the functional control manifold 18. Fluid flow between the first internal passageway 108 and the fourth internal passageway 134 is controlled by the first flow control, or blocking, valve 42 disposed in a threaded valve seat pocket 138, which controls fluid flow between the first internal passageway 108, thence through the third internal passageway 112 and the fourth internal passageway 134. In similar manner, the second flow control, or blocking valve 44 is disposed in a threaded valve set pocket 140 and controls fluid flow between the second internal passageway 110 and thence through the third internal passageway 112 and the fourth internal passageway 134. The vent port control valve 136 is mounted in a threaded valve seat pocket 142 which is in direct communication with the vent port 40 by way of a fifth internal passageway 146 that extends between the threaded valve seat pocket 142 and the vent port 40.

More specifically, in this embodiment, the internal passageway 112 is comprised of several portions or segments. A first portion of the internal passageway 112 extends between the respective first and second internal passageways 108, 110 and the corresponding valve seat pockets 138, 140 of the first and second flow control valves 42, 44. A second portion of the third internal passageway 112 extends between the respective valve seat pockets of the first and second flow control valves 42, 44, and a third portion of the third internal passageway 112 which extends transversely across full functional control manifold 18. In order to form the third portion of the third internal passageway 112, a manufacturing access hole 148 is provided on one side of the manifold 18. The hole 148 is closed by a threaded plug after formation of the transverse, or third portion, of the internal passageway 112.

In the third embodiment of the two-piece manifold system 10", the functional control manifold 18 enables the first and second flow control valves 42, 44 to provide a cross-over function that is helpful in testing for leakage of either of the valves 42, 44. If either one of the blocking cross-over valves 42, 44 is leaking, when the vent port control valve 136 is open, the leakage can be detected at the vent port 132 at the rear of the functional control manifold 18. Additionally, if the vent port control valve 136 is closed, and both of the blocking cross-over valves 42, 44 are opened, pressure in the first and second internal passageways 108, 110 will be equalized, or balanced, and the test instrument will register no pressure differential between the two internal passageways. Still further, in the functional control manifold 18, the internal passageways 108, 110 can be separately bled to atmosphere by opening the corresponding blocking, or flow control valve 42, 44 and the vent port control valve 136.

In the functional control manifold 18, condensate drains through the following path, which can be seen with specific reference to FIGS. 18–21: The sensing ports of the transmitter 100 drain directly through the outlet ports 118, 120 and then directly through the respective internal passageways 108, 110 and through the corresponding inlet ports 114, 116 to the base manifold 12; the internal passageway 13 drains through the valve seat pocket 142 and thence through the respective internal passageways 108, 110 into the base manifold 12. The fourth internal passageway 134 is always open to the vent port 132.

Thus, it can be readily seen that the two-piece manifold system 10, 10', 10" for mounting pressure sensing transmitters, or similar pressure sensing apparatus, provides a flexible manifold system that has significant benefits not found in one-piece manifold arrangements. Importantly, the base manifold 12 can be mounted at a desired location in a fluid processing system, and the process lines 66, 68 connected to the base manifold 12 prior to receiving and installing the pressure transmitter unit 100. Moreover, a desired functional manifold 14, 16, 18 can be attached to the transmitter 100 at the factory or shop where the mounting screws can be accurately tightened to the specific, generally high, torque values required by the transmitter manufacturer. Precise torque values of the manifold-to-transmitter mounting bolts are often difficult to achieve in field installations. Furthermore, having the functional control manifold component 14, 16, 18 preattached to the test instrument protects the critical sensing foils of the transmitter 100 during shipping, handling, and installation. The sensing foils are generally positioned very close to, or even at, the respective inlet ports of the transmitter 100. In addition, if it is desired to change the functional manifold 14, 16, 18 to one having a different functional application, for example, if it is desired to switch the single block and control vent manifold 14 for the double-block and bleed cross-over manifold 18, the blocking valves 46, 48 in the base manifold 12 can be closed, the transmitter 100 and attached manifold 14 removed from the base manifold 12 and switched for the desired manifold 18 prior to remounting on the base manifold 12. A further advantage of all embodiments of the two-piece manifold systems embodying the present invention, is that condensate will fully drain from all pressure cavities in the assembled system to eliminate potential errors during calibration of the test instrument 100.

Although the present invention is described in specific exemplary embodiments, with specific illustrative valve constructions and positions, those skilled in the art will recognize that changes in those constructions and positions may be made without departing from the spirit of the invention. Such changes are intended to fall within the scope of the following claims. Other aspects, features, and advantages of the present invention may be obtained from a study of this disclosure and the drawings, along with the appended claims.

What I claim is:

1. A two-piece manifold system, comprising:

a base manifold having first and second spaced apart sides, first and second internal passageways, and first and second flow control valves, said first sides having a first inlet port and a second inlet port provided therein and said second side having a first outlet port and a second outlet port provided therein, said first internal passageway providing fluid communication between said first inlet port and said first outlet port and said second internal passageway providing fluid communication between said second inlet port and said second outlet port, said first flow control valve being arranged to selectively control fluid flow through said first passageway, and said second flow control valve being arranged to selectively control fluid flow through said second passageway;

a functional control manifold having a first side adapted to mate with said second side of the base manifold and a second side spaced from the first side and adapted to mate with a predefined mounting surface of a test instrument, first, second and third internal passageways, and at least one flow control valve, said first side having a first inlet port and a second inlet port provided therein at a position arranged to respectively mate with the first and second outlet ports of the base manifold and said second side having a first outlet port and a second outlet port provided therein, said first internal passageway providing fluid communication between said first inlet port and said first outlet port, said second internal passageway providing fluid communication between said second inlet port and said second outlet port, and said third internal passageway providing fluid communication between said first internal passageway and said second internal passageway, and said at least one flow control valve being arranged in said functional control manifold to selectively control fluid flow through said third passageway;

means for attaching said functional control manifold to said base manifold; and means for attaching said functional control manifold to said test instrument.

2. A two-piece manifold system, as set forth in claim 1, wherein said functional control manifold includes a fourth internal passageway and a fifth internal passageway and a first vent port and a second vent port, said fourth internal passageway providing fluid communication between said first internal passageway in the functional control manifold and said first vent port, and said fifth internal passageway providing fluid communication between said second internal passageway in the functional control manifold and said second vent port.

3. A two-piece manifold system, as set forth in claim 2, wherein said functional control manifold includes a second flow control valve arranged to selectively control the flow of fluid through said fourth internal passageway, and a third fluid flow control valve arranged to selectively control the flow of fluid through said fifth internal passageway.

4. A two-piece manifold system, as set forth in claim 1, wherein said functional control manifold includes a vent port and a fourth internal passageway extending between said third internal passageway and said vent port, said at least one flow control valve being arranged to control the flow of fluid through a portion of said third internal passageway extending from said first internal passageway in the functional control manifold and said fourth internal passageway, a second flow control valve arranged to control the flow of fluid through a second portion of said third internal passageway extending from said second internal passageway in the functional control manifold and said fourth internal passageway, and a vent port control valve arranged to control the flow of fluid through said fourth internal passageway.

5. A two-piece manifold system, as set forth in claim 1, wherein said base manifold has a plurality of through-holes arranged in a predetermined pattern, and said functional control manifold includes a plurality of threaded blind holes arranged in said predetermined pattern in mating alignment with the through holes of said base manifold, and said means for attaching said functional manifold to said base manifold includes a plurality of threaded members each of which extend through a respective through-hole of the base manifold and is threadably received within a respective threaded blind hole of said functional control manifold.

6. A two-piece manifold system, as set forth in claim 1, wherein said functional control manifold has a plurality of stepped holes extending through the functional control manifold, and said means for attaching the functional control manifold to a predefined test instrument includes a plurality of cap screws, each of which have a head portion wholly received within a respective one of said stepped holes.

\* \* \* \* \*